UNITED STATES PATENT OFFICE.

HERMANN SCHERPE, OF DÜREN, GERMANY, ASSIGNOR TO THE FIRM OF DR. DEGEN & KUTH, OF DÜREN, GERMANY.

PROCESS FOR VULCANIZING A RUBBER SOLUTION.

No. 906,306.  Specification of Letters Patent.  Patented Dec. 8, 1908.

Application filed May 28, 1908. Serial No. 435,507.

*To all whom it may concern:*

Be it known that I, HERMANN SCHERPE, Ph. D., a subject of the King of Prussia, and a resident of Düren, Rhenish Prussia, in the Kingdom of Prussia, German Empire, have invented certain new and useful Improvements in Vulcanized-Rubber Solutions and Processes of Producing Same, of which the following is a specification.

This invention relates to the vulcanization of rubber in form of a solution so that the solution thereafter contains rubber in vulcanized form.

In vulcanizing the rubber in solutions by employing sulfur chlorid, vulcanization is effected without the application of heat but in this method the vulcanization takes place during evaporation and the vapors given off are highly poisonous and cause irritating coughing.

According to the present invention the rubber solution is mixed with an iodin solution which is capable of mixing therewith, and the result is that the rubber of the solution is vulcanized while at the same time the sticky and viscous characteristics are taken from the solution without causing decomposition of same. Heating of the mixture is not necessary according to the new process.

The following particular example of this invention produces a rubber solution in which the rubber is contained in vulcanized form and which is exceedingly useful for surgical purposes being adapted to sink well into the pores of the skin and thereby extremely serviceable as a hand covering or as the covering for the surface to be operated upon. 4 grams of best Pará rubber are dissolved in 100 grams of tetrachlorid of carbon and mixed cold with a solution of 0.4 grams of iodin in 100 grams of tetrachlorid of carbon. After standing for a considerable length of time the mixture loses its stickiness and viscosity and may be filtered and sterilized. The resulting solution contains rubber in vulcanized form and does not give off poisonous vapors nor is it dangerously inflammable.

I claim:

1. The method of producing a vulcanized rubber solution consisting in mixing a rubber solution with an iodin solution adapted to be mixed therewith.

2. The method of producing a vulcanized rubber solution consisting in mixing a solution of rubber in tetrachlorid of carbon with a solution of iodin in tetrachlorid of carbon.

3. The method of producing a vulcanized rubber solution consisting in mixing a solution of rubber in tetrachlorid of carbon with a solution of iodin in tetrachlorid of carbon, allowing the mixture to rest, and filtering the solution thus obtained.

4. The method of producing a vulcanized rubber solution consisting in mixing a solution of rubber in tetrachlorid of carbon with a solution of iodin in tetrachlorid of carbon, allowing the mixture to rest, filtering the solution thus obtained, and sterilizing same.

5. As a new article of manufacture, a vulcanized rubber solution derived from rubber, iodin, and a suitable solvent.

6. As a new article of manufacture, a vulcanized rubber solution derived from a solution of rubber in tetrachlorid of carbon, and a solution of iodin in tetrachlorid of carbon.

7. As a new article of manufacture, a vulcanized and sterilized rubber solution derived from rubber and iodin both dissolved in tetrachlorid of carbon.

In witness whereof I have hereunto set my hand in the presence of two witnesses.

HERMANN SCHERPE.

Witnesses:
 HENRY QUADPLIEG,
 ELISE KOCLBUSCH.